(12) United States Patent
Larsson et al.

(10) Patent No.: US 6,409,253 B2
(45) Date of Patent: Jun. 25, 2002

(54) FRONT STRUCTURE IN A VEHICLE

(75) Inventors: Johnny K Larsson, Gothenburg; Clas Jernström, Askim, both of (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/682,490

(22) Filed: Sep. 7, 2001

Related U.S. Application Data

(63) Continuation of application No. 09/308,326, filed as application No. PCT/SE97/01960 on Nov. 21, 1997, now Pat. No. 6,302,476.

(30) Foreign Application Priority Data

Nov. 21, 1996 (SE) .................................. 9604275

(51) Int. Cl.[7] .............................................. B62D 21/15
(52) U.S. Cl. ................... 296/188; 296/189; 296/203.01
(58) Field of Search .................................. 296/188, 189, 296/203.01, 204; 280/784; 180/274

(56) References Cited

U.S. PATENT DOCUMENTS

| | | | | |
|---|---|---|---|---|
| 3,842,930 A | * | 10/1974 | Fiala ........................... | 180/274 |
| 3,893,726 A | * | 7/1975 | Strohschein ................. | 293/133 |
| 4,050,537 A | * | 9/1977 | Bez | |
| 5,460,421 A | * | 10/1995 | Culberson ................... | 293/133 |
| 5,727,815 A | * | 3/1998 | Smith .......................... | 280/784 |
| 6,019,419 A | * | 2/2000 | Browne ....................... | 296/189 |

FOREIGN PATENT DOCUMENTS

| | | | |
|---|---|---|---|
| EP | 0 278 912 | * | 8/1988 |
| EP | 0 788 930 | * | 8/1997 |

* cited by examiner

Primary Examiner—Joseph D. Pape
Assistant Examiner—Patricia Engle
(74) Attorney, Agent, or Firm—Kilpatrick Stockton LLP

(57) ABSTRACT

Front structure in a vehicle, comprising a pair of spaced longitudinal box-shaped lateral beams (2), to which explosive charges (10) are fixed. With the aid of retardation sensors (20), a control unit (21) and detonators (22), the explosive charges are triggered in a collision after a certain crumpling deformation distance of the front portion of the beams to weaken the beams and prevent buckling and thus extend the crumpling deformation distance to the beam section lying therebehind. The controlled unit is arranged to compare the signals from the retardation sensors and activate the detonators only if the difference between the signals is below a predetermined value indicating relatively symmetrical frontal collision.

7 Claims, 5 Drawing Sheets

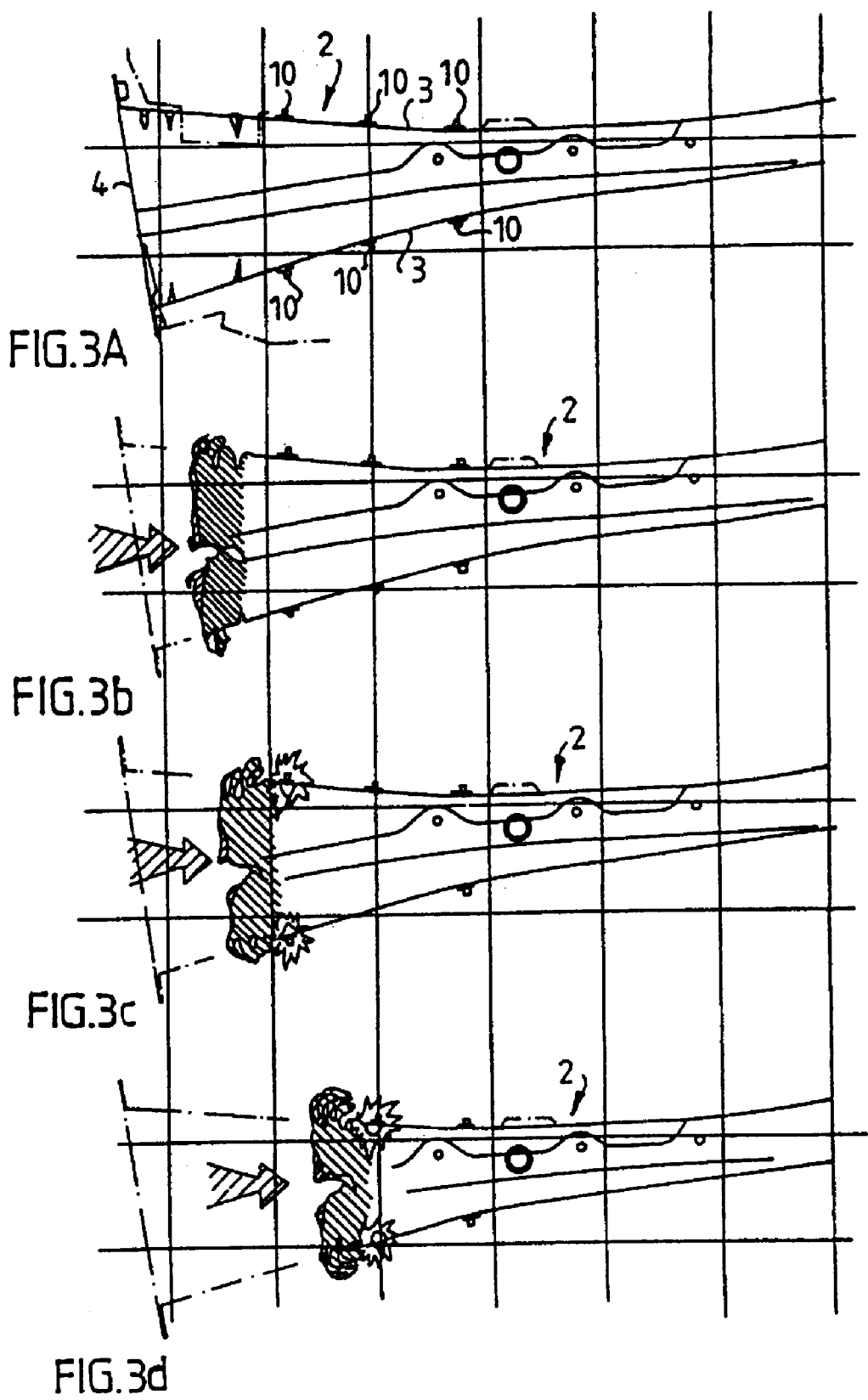

though for prior art. The invention is based on the beams 2 being active, and this is achieved in the embodiment shown in FIGS. 1 and 4 by subjecting the beams, during a collision, to explosive charges which actively deform the beams.

FRONT STRUCTURE IN A VEHICLE

CROSS REFERENCE TO RELATED APPLICATIONS

The present application is a continuation application of U.S., patent application Ser. No. 09/308,326, filed May 19, 1999, now U.S. Pat. No. 6,302,476, which is a 371 of PCT/SE97/01960, filed Nov. 21, 1997. The full disclosure of said application, in its entirety, is hereby expressly incorporated by reference into the present application.

BACKGROUND OF INVENTION

Technical Field. The present invention relates to a frontal structure in a vehicle comprising a pair of laterally spaced beams, each comprising a sheet metal box element having greater length than both width and height, and a portion which is oriented in the longitudinal direction of the vehicle, as well as a sensor or means for sensing the retardation of the vehicle during a collision and, as a function thereof, changing the rigidity of the beam in its longitudinal direction.

Background Information. Box beams are used in a number of different applications in automobiles, for example, as the front side members in passenger car chassis, and are thus components whose design crucially affects the crash safety of the vehicle. In attempting to achieve high crash safety, it has always been striven for, by a controlled crash sequence, to force as far as possible the elements in the structure to be deformed in the most energy absorbing manner, which is progressive upsetting or crumpling. Less energy-absorbing reactions such as rotation, buckling or bending should thus be avoided.

Ideally, from a collision safety point of view, the volume represented by the front portion of the vehicle should consist of a large number of cells, each of which having a large energy-absorbing capacity, regardless of from which direction the vehicle is struck, but such solutions have not been applicable in mass production for a number of reasons.

Normally, the beam system in a vehicle is regarded as a passive security system where it is primarily the geometric shape of the box-shaped beams which, by virtue of their energy-absorbing capacity, determine the collision security. It is, however, known to arrange an "active" beam system in a vehicle, i.e. a system where a collision triggers an activity which makes the beam system perform in a manner exceeding its normal mechanical limits. Such an active beam arrangement is known, e.g. by U.S. Pat. No. 4,050,537. Here, an explosive charge is used to change, in a collision, the cross section of a box beam in such a manner that its rigidity, and thus its energy-absorbing capacity, increases.

SUMMARY OF INVENTION

The purpose of the present invention is to develop a frontal structure with an active beam system making it possible to adapt deformation and energy-absorbing capacity to various collision situations.

This is achieved according to the invention by virtue of the fact that the beams are each coordinated with an individual retardation sensor, each disposed to send an individual retardation-dependent signal to a control unit, which is disposed to compare the signals and activate said means to change the rigidity of the beams depending on the difference between the signals from the retardation sensors.

The invention creates an active frontal structure where technology which is known per se is used in an entirely new manner, built on the idea of dimensioning the beams for a certain collision situation requiring a certain rigidity and changing the rigidity of the beams for collision situations in which another rigidity is desirable.

The invention is in particular directed to a frontal structure in which the rigidity of the 20 beams, which dictates the deformation sequence and the energy-absorbing capacity, can be adapted to a more or less symmetrical frontal collision and to a so-called offset collision, i.e. a collision with a vehicle or object which strikes essentially to one side of the longitudinal center-plane of the vehicle.

In one embodiment, the beams can be dimensioned for offset collision, requiring great rigidity, since the entire, or most, deformation energy must be absorbed by only one of the beams. In a symmetrical frontal collision, the deformation energy is distributed between the beams, and the optimum absorption is obtained in this case by reducing the rigidity of the beams.

The beams in the frontal structure are thus active. By studying the deformation of a passive beam after a collision, it is possible to determine where the transition occurred between upsetting or crumple-fold-formation and buckling of the entire beam, for example. By actively softening the beam in this area, for example with the aid of small pyrotechnical charges, the buckling can be avoided and the crumple-fold-formation distance can thus be extended over the softened area to the area behind it, which can be more rigid.

In another embodiment, the beams can be dimensioned with a cross-sectional profile which provides optimum rigidity during a symmetrical frontal collision, the means for changing the rigidity of the beams being disposed in an offset collision to increase the rigidity by changing the cross-sectional profile, as disclosed in U.S. Pat. No. 4,050, 537.

BRIEF DESCRIPTION OF DRAWINGS

The invention will be described in more detail below with reference to examples shown in the accompanying drawings, wherein:

FIGS. 3a–3d are views from above of a portion of the beam in FIG. 2a in various states of deformation;

DETAILED DESCRIPTION

Figure 1:
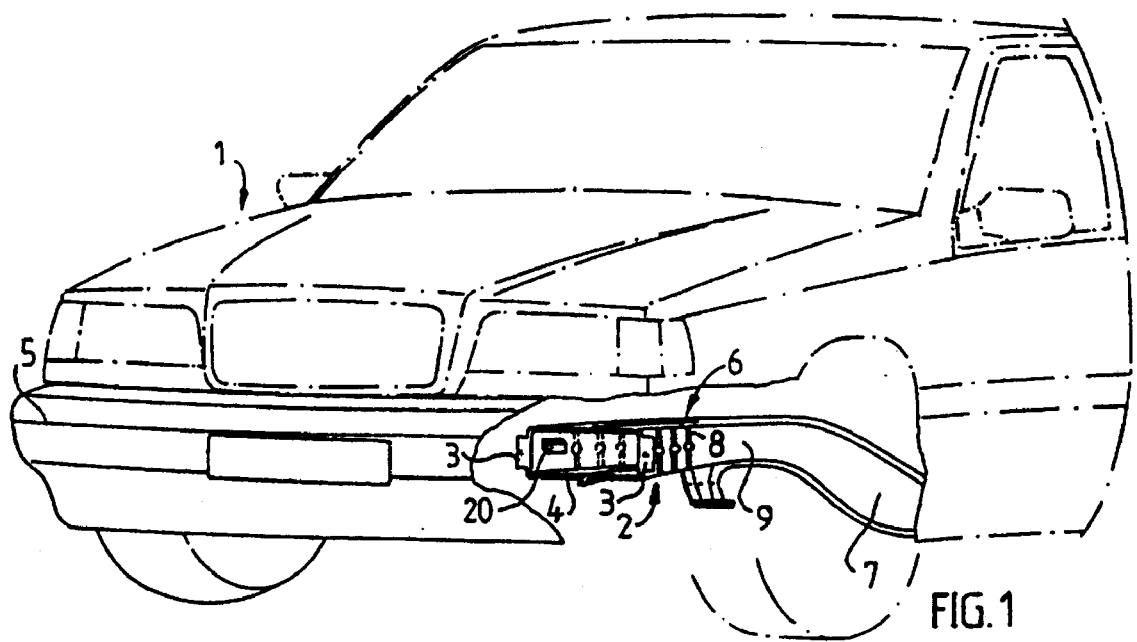
FIG. 1 shows a perspective view of a first embodiment of a frontal structure according to the invention of a schematically indicated passenger car.
Figure 4:
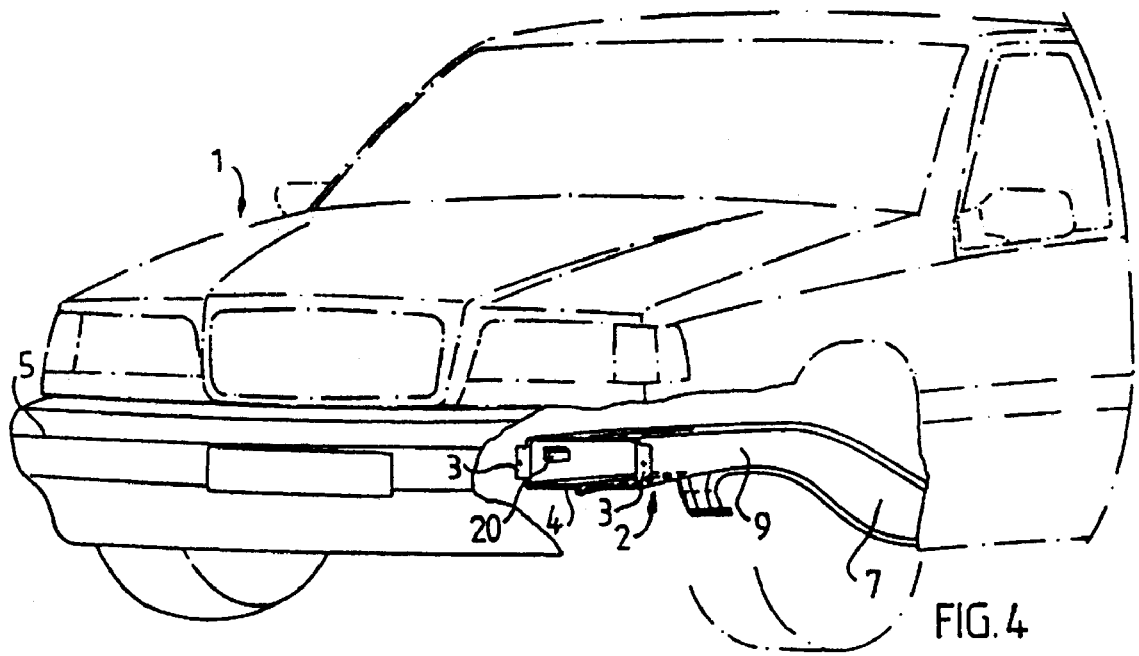
FIG. 4 is a perspective view corresponding to FIG. 1 of a second embodiment.

In FIGS. 1 and 4, 1 designates a vehicle body of a self-supporting type. A box beam, generally designated 2, is one of two side beam members fixed symmetrically relative to the longitudinal center-plane of the automobile. The beam 2 consists of two U-profiles 3, which are joined to each other by spot-welding to form a rectangular box profile. The beam shown, and its general construction and function are well known and need not be described in more detail here. It should suffice to say that in one car model available on the market, the lateral beams serve as supports for an intermediate frame, which in turn supports the engine. As can be seen in the Figures, the beam is tapered to the shape of a horn. Its end 4 (to the left in the Figures) is joined to the front bumper S (FIGS. 1 and 4). From its straight forward portion, which extends in the longitudinal direction of the vehicle, the beam curves into a curved rear portion 7, which is joined to the bottom plate of the vehicle.

Figure 2A:
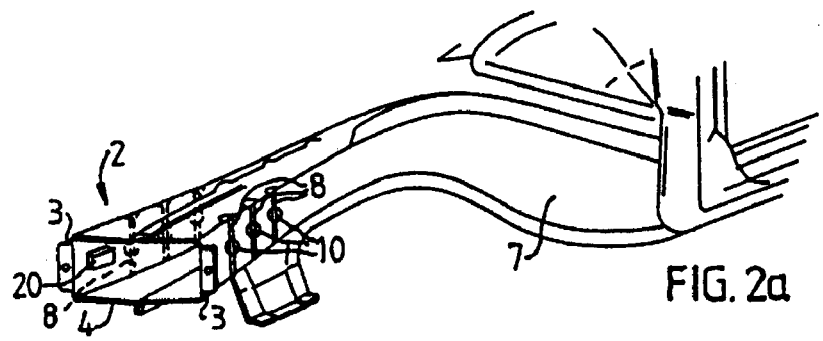
FIGS. 2a and 2b show perspective views of the beam construction of the frontal structure prior to and after a certain deformation.
Figure 2B:
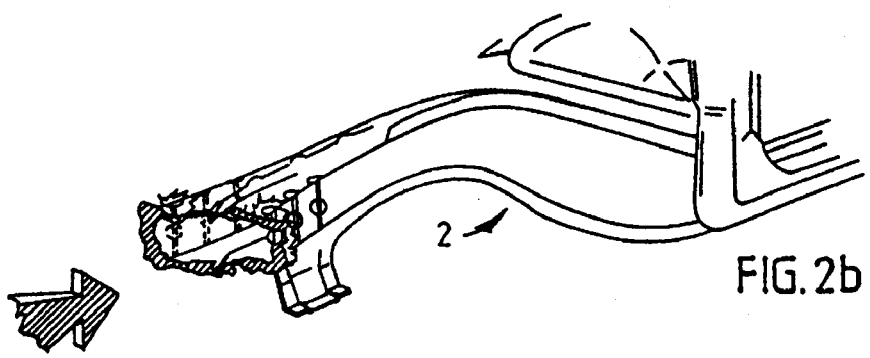

Each beam 2 in the embodiment shown in FIGS. 1–3, has stamped indentations 8 in the facing vertical beam sides 9. Small explosive charges 10 are fixed in the indentations. The indentations 8 with the explosive charges 10 are arranged in a section which must be temporarily prevented from buckling and the beams are dimensioned here to support the structure in front of it so that it is exploited effectively for energy absorption by optimizing the upsetting or crumple-fold-formation process. When the deformation reaches the portion with the explosive charges 10, these are activated sequentially to weaken the beams and prevent them from buckling so that the upsetting or crumple-fold-formation sequence and the energy absorption can continue in the beam portion there behind.

A retardation sensor in the form of an accelerometer 20 is mounted at the front end of 20 each beam 2. This can be of the type used to trigger airbags. The accelerometers 20 on the beams 2 are coupled to a control unit, e.g. a microprocessor 21, to which the electrically activated detonators 22 for the explosive charges 10 are also connected. The control unit 21 is programmed to control the triggering of the explosive charges on the respective beam sequentially, as is shown in FIGS. 3a–3d, depending on the signals from the accelerometers 20.

The control unit 21 is disposed to compare the signals from the accelerometers 20 with each other and to activate the detonators 22 in accordance with a pattern dependent on the differential signal. For example, the control unit 21 can be programmed to trigger the explosive charges 10 of both beams 2 simultaneously at a certain moment, if the differential signal drops below a certain predetermined value indicating a relatively symmetrical frontal collision, where both beams 2 are to be employed at the same time for energy absorption. If the differential signal is large, indicating a so-called offset collision, the beam 2 on the impact side during the collision must absorb greater force 5 and more energy and therefore, depending on the crash sequence, it can be advantageous to not trigger the explosive charges at all or to trigger them at another point in time than for symmetrical frontal collision. This presupposes that the beams 2 are optimized for offset collision, which means that weakening of the beams will be necessary in symmetrical collision, in order to be able to optimally exploit the entire available deformation distance.

Figure 5A:
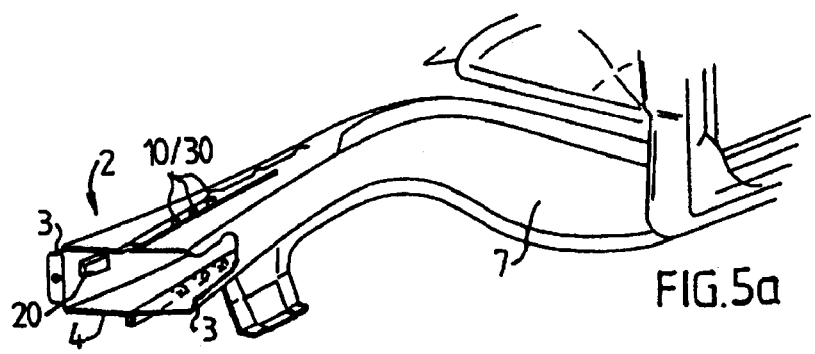
FIGS. 5a and 5b are views corresponding to FIGS. 2a,2b of the embodiment in FIG. 4.
Figure 5B:
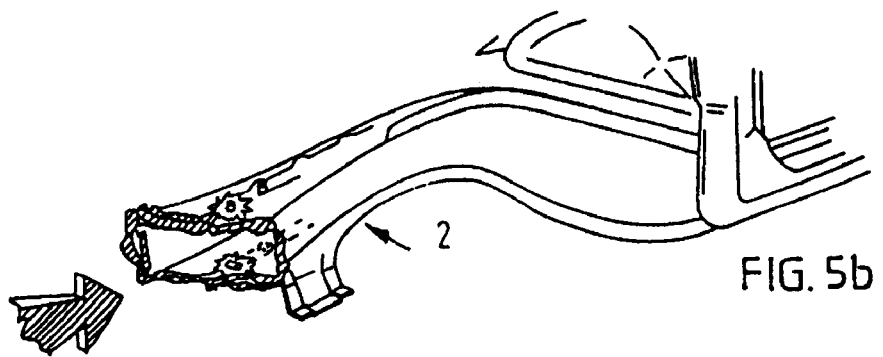
Figures 6A, 6B, 6C, 6D:
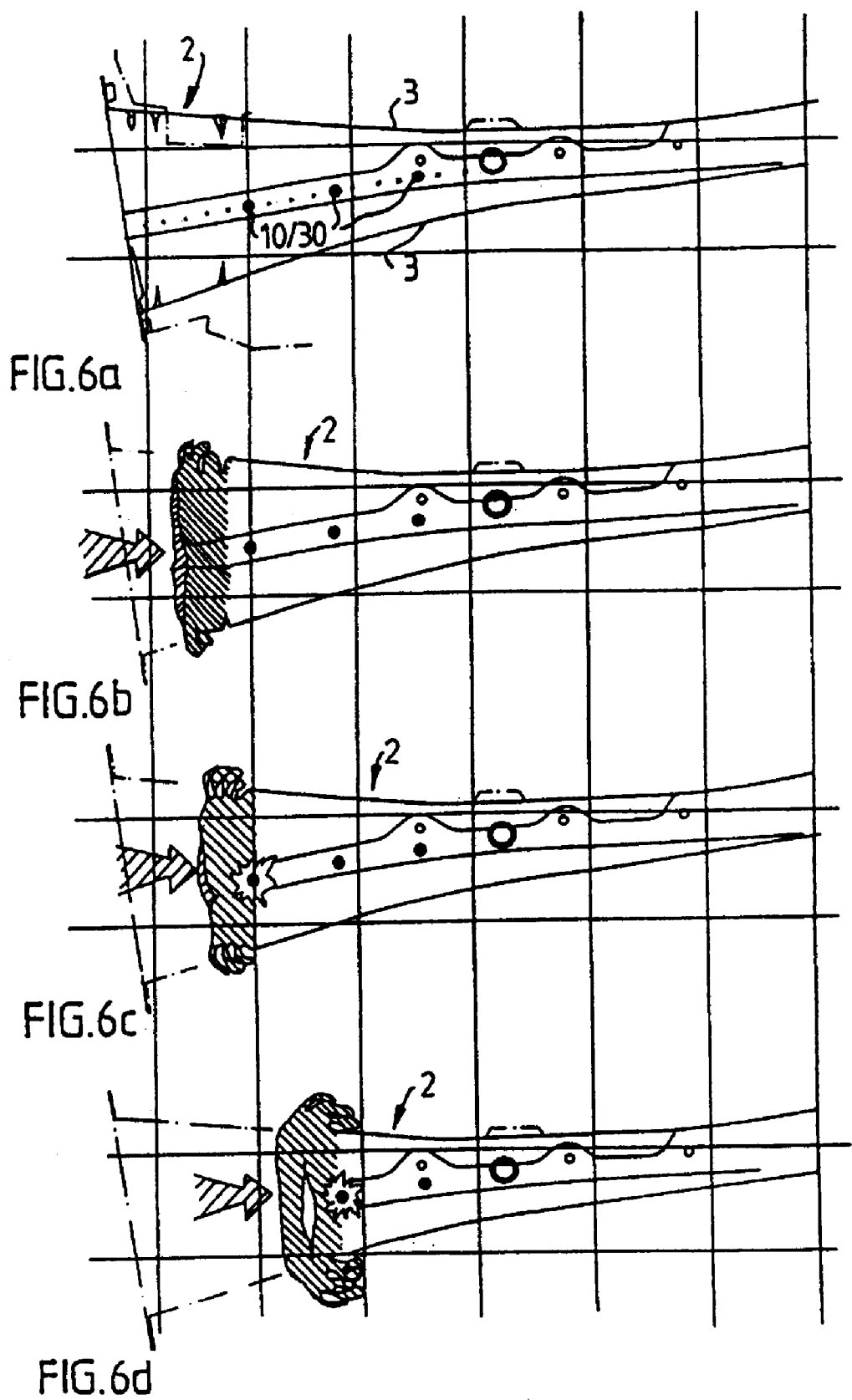
FIGS. 6a–6d are views corresponding to FIGS. 3a–3d of the embodiment in FIG. 4.
Figure 7:
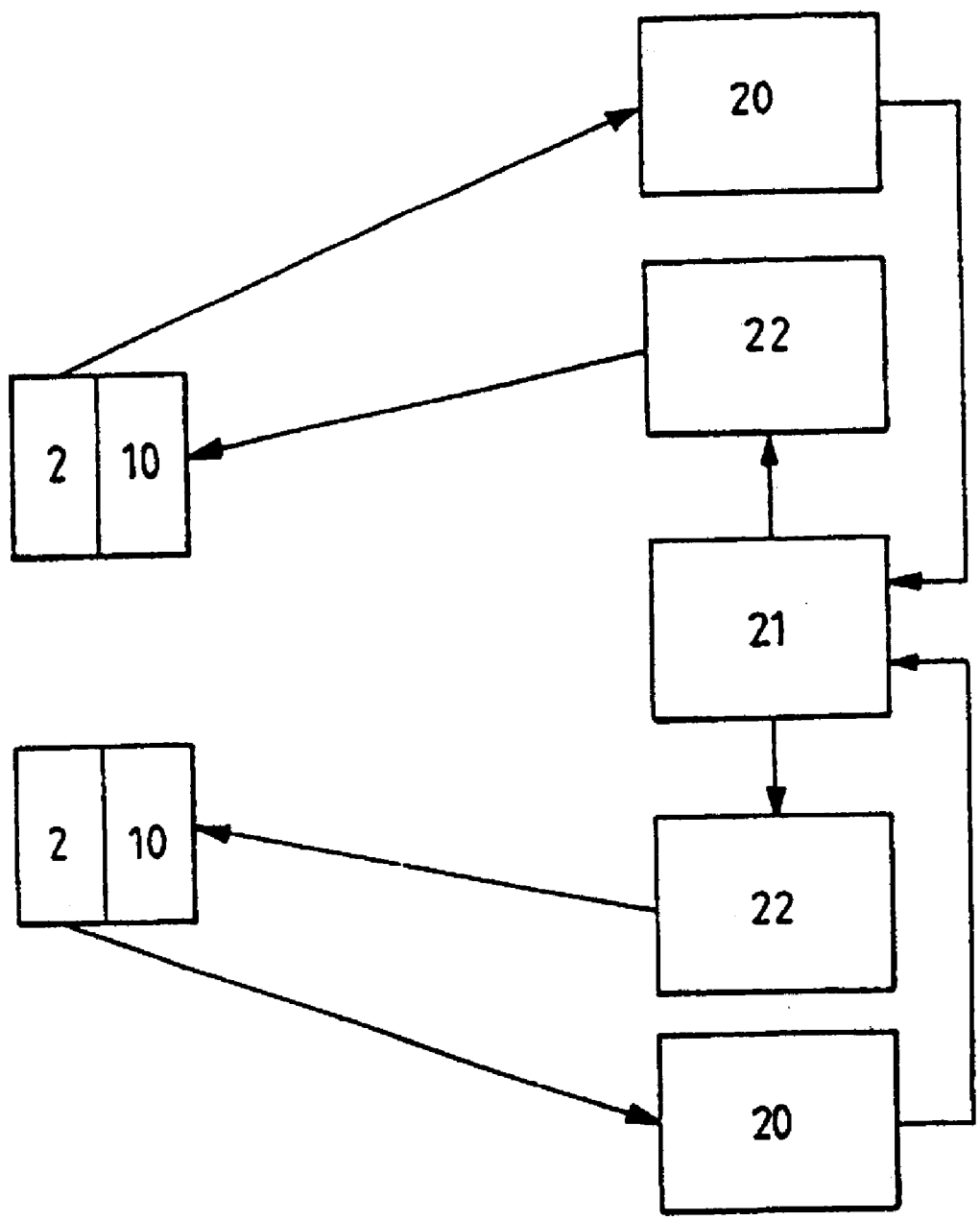
FIG. 7 is a block diagram of a control system for active deformation control.

In the embodiment shown in FIGS. 4–6, the U-profiles 3 of the beams 2 are joined together by means of rivets 30, some of which are provided with explosive charges 10. Weakening of the beams 2 is in this case achieved by exploding off these rivets 30 and thus breaking the joint between the U-profiles 3 at selected locations along the beam, as shown in FIGS. 6a–6d.

The invention has been described above with reference to examples in which the explosive charges 10 are applied directly to the beams 2. Other variants are of course also conceivable. For example, some form of gas generator arrangement can be used, which in a collision creates an over-pressure in cavities in the beam segments which will then rupture or be deformed in such a manner that the required weakening is achieved. In another embodiment (not shown), a gas generator arrangement can be used in another manner, so that the required over-pressure in the beam cavities is only permitted to increase so much that the cross-section profile of the beams is changed without any rupture occurring. In this manner, the rigidity can be increased, for example, by changing a square or rectangular cross-section of the beam so that it will become more or less circular or elliptical. In this case, the beams are made less rigid to adapt to a symmetrical frontal collision and are stiffened in the event of an offset collision.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. Frontal structure in a vehicle, comprising:
    a pair of laterally spaced beams, each comprising a sheet metal box element having a greater length than both width and height, and having a portion which is oriented in the longitudinal direction of the vehicle; and
    means for sensing the retardation of the vehicle during a collision and, as a function thereof, differently changing the rigidity of each beam in its longitudinal direction based on the retardation of the vehicle.

2. Frontal structure according to claim 1, wherein the sensor further comprises explosives, which upon detonation are disposed to reduce the rigidity of the beam in its longitudinal direction.

3. Frontal structure according to claim 1, wherein the sensor further comprises:
    explosives fixed to the beam,
    a control unit,
    a retardation sensor disposed to provide a signal dependent on the retardation to the control unit, and
    an activation device controlled by the control unit, by means of which the explosives can be caused to detonate.

4. Frontal structure according to claim 3, wherein the explosives further comprise explosive charges spaced sequentially in a longitudinal direction of the beam, and wherein the control unit is disposed to cause the explosive charges to detonate sequentially in the deformation direction of the beam.

5. Frontal structure according to claim 3, wherein the explosives are arranged upon detonation to dent the beam metal.

6. Frontal structure according to claim 1, wherein the beam consists of at least two sheet metal profiles joined to each other by means of fastener elements, and wherein said means further comprises explosives arranged upon detonation to break the joint between the profiles.

7. Frontal structure according to claim 6, wherein the fastener elements are rivets, and wherein the explosives are arranged upon detonation to blast free at least certain rivets.

* * * * *